United States Patent Office 2,772,059
Patented Nov. 27, 1956

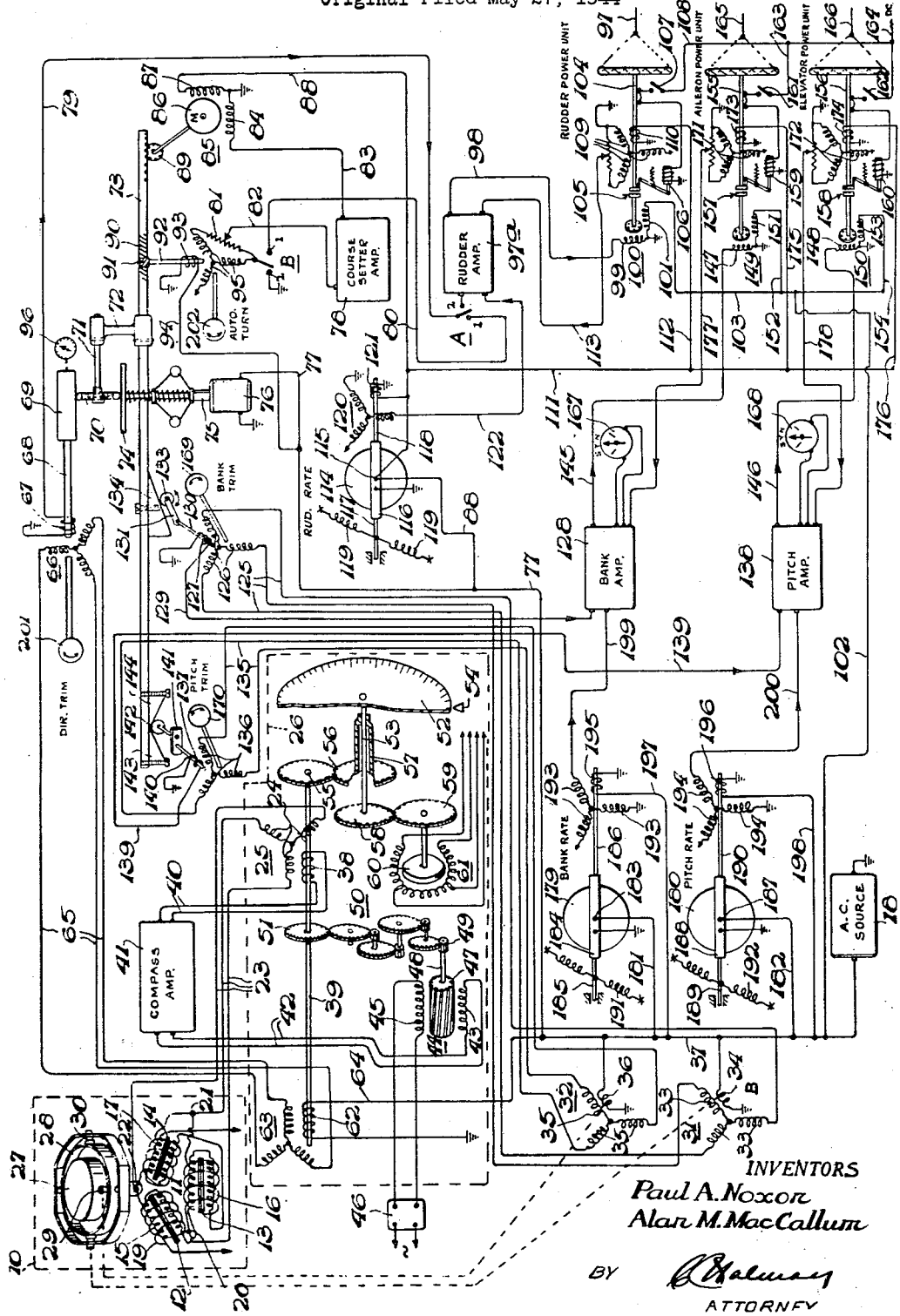

2,772,059
AUTOMATIC PILOT

Paul A. Noxon, Tenafly, and Alan M. MacCallum, Maywood, N. J., assignors to Bendix Aviation Corporation, Teterboro, N. J., a corporation of Delaware Original application May 27, 1944, Serial No. 537,952. Divided and this application October 21, 1949, Serial No. 122,792.

5 Claims. (Cl. 244—77)

The present invention relates to an automatic navigational control system adapted for use with dirigible craft and constitutes a division of application Serial No. 537,952, filed May 29, 1944.

Control systems of this general nature which have been heretofore utilized have relied principally upon either pneumatic or hydraulic pressures, or a combination of both, for energizing the servomotors of various control surfaces. As a result, known systems possessed certain drawbacks, one being that where widely varying altitudes were traversed, the wide change in air densities affected the reliability of pneumatic systems while extreme changes in temperatures produced undesirable effects on hydraulic systems. Moreover, the numerous conduits required in such pressure systems were particularly vulnerable to gun fire where the systems were used on war craft.

An object of the present invention, therefore, is to provide a novel and improved automatic navigational control system with the use of which the foregoing disadvantages are overcome.

Another object of the present invention is to provide a novel all electric automatic pilot for aircraft of all sizes and uses whereby outstanding ease of control and complete maneuverability are obtained. The advantages of an all electric automatic pilot will be obvious. For example, the operation of such a system will not be hindered by high altitude flight or by flight through dust laden atmospheres. Moreover, the various electrical units constituting the pilot of the present invention are, to a certain extent, self-heating so that no difficulty is encountered in operation at low temperatures.

A further object of the invention is to provide a novel automatic pilot in which the displacement signals for each axis of control are derived from a common electrical instrument and transmitted to operate electric servomotors of related control surfaces so that a rapid response on the part of the control surfaces is obtained.

Another and further object is to provide a novel automatic pilot in which the various displacement signals may be readily added algebraically thereby making possible the free use of derivates and superimposed controls whenever and wherever required.

A still further object of the invention is to provide a novel all electric, substantially contactless, A. C. steering system for dirigible craft.

Another object is to provide an improved and novel all electric automatic pilot providing control about three axes.

A further object is to provide a novel automatic three-axes-of-control pilot having a rate control superimposed on each axis.

Another object is to provide an automatic pilot for dirigible craft wherein an electric servomotor is energized in response to a signal generated as a result of a craft departure from a prescribed position to operate a control surface, a follow-back signal being generated as a result of the operation of the surface to modify operation of the motor in accordance therewith, and a rate signal being generated in proportion to the craft's angular velocity developed during craft departure from its prescribed position to add to the displacement signal and oppose the follow-back signal so that the control surface is applied more rapidly on the outward swing, a point being reached where the follow-back signal is equal and opposite to the displacement and rate signals to stop the motor and control surface, whereupon the craft returns to its prescribed position. On return, the rate signal is reversed to oppose the displacement signal, but adds to the follow-back signal, whereby the craft is prevented from overswinging its prescribed position once it attains that position, a reverse operation being applied to the control surface prior to the craft's return to its prescribed position to provide a braking action thereon.

A further object is to provide a novel automatic pilot having a direction trim control which may be operated to develop any amount of change in heading desired with the automatic pilot engaged and without disconnecting any of the component units from the system, the craft assuming straight flight once the new heading has been attained.

Another object is to provide a novel automatic pilot having an automatic turn control whereby any desired rate of turn may be set in, bank and pitch signals being automatically developed for the rate of turn called for.

The above and other objects and advantages of the present invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not designed as a definition of the limits of the invention.

The single figure of the drawing is a diagrammatic illustration of the novel automatic steering system of the present invention.

The novel automatic navigation control system comprising the subject matter of the present invention embodies a master instrument from which displacement, bank and pitch signals are available for controlling the craft in heading, as well as in position about its transverse and longitudinal axes. Repeater systems are interposed in the direction displacement channel whereby a change in heading of any desired amount may be pre-set with the system engaged by injecting an artificial displacement signal into one of the repeaters, the craft changing heading until such time as the main displacement signal catches up with and corresponds to the pre-set signal whereupon straight flight is assumed by the craft on the new heading. Furthermore, an automatic turn provision is made whereby any desired steady rate of turn may be imposed upon the craft, the proper direction displacement, bank and pitch signals for the predetermined rate of turn being automatically developed without imposing any positive load upon the master instrument normally controlling such functions.

Referring now to the single figure of the drawing for a more detailed description of the present invention, a master instrument 10 is there shown having a magnetic field pick-up device in the form of a gyro stabilized earth inductor compass. The pick-up device comprises a triangular element 11, having laminated legs 12, 13 and 14, each having wound thereon exciting windings 15, 16 and 17, each of the windings being divided into two coils, each pair of coils surrounding a related laminated leg and being connected in series opposed relation. The windings are energized from a suitable source of alternating current such, for example, as source 18. The secondary of device 11 comprises a delta connected coil 19 having three taps 20, 21 and 22 which connect by way of suitable leads 23 with a three phase wound stator 24 of an inductive coupling device 25 mounted within a master indicator shown generally by the reference character 26.

The theory and operation of the magnetic field pick-up device or earth inductor compass is described in greater detail in copending application Serial No. 445,102, filed May 29, 1942 and now matured into Patent No. 2,710,-942, granted June 14, 1955, to John F. Emerson. For present purposes it is only necessary to point out that each leg 12, 13 and 14 is saturated and de-saturated twice for every cycle of the exciting current flowing within primary windings 15, 16 and 17. Thus, the flux threading each leg, due to the earth's magnetic field, is expelled from and re-enters each leg twice for each cycle of the exciting current. Since each pair of the coils of the primary windings 15, 16 and 17 of each leg are wound in series opposed relation no effect is induced on secondary coil 19 by the exciting current itself. Except when the exciting current has attained a substantially maximum value, either positive or negative, the earth's magnetic field is free to traverse each leg. As a result of the earth's field voltages are induced at the three taps 20, 21 and 22 of secondary coil 19 differing and dependent in value on the direction in which the pick-up element is positioned with reference to the earth's magnetic field. The magnetic field pick-up device, therefore operates as an earth inductor compass in that for every deviation from a prescribed course the induced voltages at the three taps of the secondary 19 will vary in accordance with deviation.

In order to provide a compass in which turning and acceleration errors are, for all practical purposes, eliminated so that the tendency of the compass to oscillate or overswing is thereby prevented, element 11 is securely fastened to a rotor casing 27 of a three-degree-of-freedom gyroscope having an electrically driven rotor, not shown, provided with vertical spin axis, mounted within casing 27 which supports the rotor for oscillation about a first horizontal axis within a gimbal ring 28 by way of trunnions 29, the gimbal, in turn, being mounted for oscillation about a second horizontal axis, perpendicular to trunnions 29, within a rigid support carried by instrument 10, by means of outer trunnions 30. A suitable erection device may be provided for maintaining the rotor spin axis normally vertical as well as a caging apparatus for caging and/or uncaging the gyro whenever desired.

In addition to stabilizing the earth inductor compass, the gyroscope is also provided with band and pitch takeoffs in the form of inductive devices 31 and 32, one of which comprises a three phase wound stator 33 having inductively coupled therewith a wound rotor 34 which is movable with trunnion 30, for example, and the other of which comprises a three phase wound stator 35 having inductively coupled therewith a wound rotor 36 which is movable with trunnions 29. Both rotors 34 and 36 are tapped to a common conductor 37 for energization by source 18. In practice take-offs 31 and 32 are mounted directly on the gyroscope, take-off 31 being on the bank axis and take-off 32 on the pitch axis, so that the three principal control signals are derived from a single master instrument. The advantages arising from such an arrangement are obvious, for example, the weight of the whole system is reduced in that where previously at least two gyroscopes were required, i.e., a directional and artificial horizon gyroscope, the present system requires only one gyroscope. Moreover, the principal controls are concentrated in a single casing whereby the device is simple to service and any difficulties rapidly corrected.

For a condition of equilibrium, i.e., with the craft on a given heading and with all controls centralized, the voltages within the three windings of stator 24 of coupling device 25 of master indicator 26 will correspond to the voltage at the three taps of secondary coil 19 of the pickup device and rotors 34 and 36 of take-offs 31 and 32 will be at a given position with respect to their related stator windings 33 and 35. At the same time, a rotor winding 38 inductively coupled with stator 24 of coupling device 25 and carried by a shaft 39, suitably journalled within master indicator 26, will be disposed in an angular position with its electrical axis normal to the resultant magnetic field of the three windings of the stator so that the voltages in the stator windings have no inductive effect on the rotor winding. As soon, however, as the craft deviates from a prescribed heading, the voltages at the three taps of secondary coil 19 will vary causing a variation in the voltages of each of the stator windings. Such change at the stator produces an angular change in the resultant of the magnetic field thereat and, since the electrical axis of the rotor winding is no longer normal to the resultant of the field at the stator, a signal is induced within rotor winding 38 which is proportional to the angle of craft deviation from its prescribed heading.

The electrical signal induced within rotor winding 38 is fed by means of suitable conductors 40 into a conventional vacuum tube amplifier 41 and out therefrom by means of leads 42 to one phase winding 43 of a two phase induction motor 44, the second phase winding 45 of which is continuously energized from source 18 through a conventional frequency doubler 46. Because, as has been shown, the frequency of the induced currents within secondary 19 is twice the frequency of the exciting current, doubler 46 is included to provide like frequencies in both motor windings and in addition, a suitable phase shifting network is embodied within the doubler so that the phases of the current within the two motor windings will be substantially 90° apart.

Upon energization of motor phase winding 43, a rotor 47 is actuated which carries a shaft 48 having a pinion 49 thereon meshing through a reduction gear system 50 with a driven gear 51 secured to shaft 39 to drive rotor winding 38 to a null position, i. e., a position wherein the electrical axis of the rotor winding assumes a position normal to the new resultant of the stator field at which point the signal in rotor 38 approaches zero and phase winding 43 of motor 44 is de-energized and the motor stops.

In order to provide an indication of the new heading or the amount of deviation off course, an indicating dial 52 is provided which is carried by a shaft 53, journalled within the master indicator, the dial being adapted for angular motion relative to a fixed index 54. Angular motion is imparted to the dial from rotor shaft 39 by way of a gear 55 fastened to the shaft and a gear 56 meshing therewith and having a hollow shaft 57 formed therewith and secured to dial shaft 53. Preferably shaft 57 is sleeved about shaft 53 and connected therewith through a compensating mechanism as shown and described in copending application Serial No. 516,488, filed December 31, 1943, and now Patent No. 2,625,348, granted January 13, 1953, to P. A. Noxon et al. By observing dial 52, the pilot will immediately know his heading. If desired the dial indication may be reproduced at several remote stations and to this end shaft 53 carries a gear 58 for meshing with a gear 59 drivably connected with the magnet rotor 60 of an electromagnetic transmitter 61 whose stator winding connects with a similar electromagnetic receiver at the remote station, such system for reproducing motion being essentially the same as that shown and described in U. S. Patent No. 2,342,637, issued February 29, 1944.

In driving rotor 38 of coupling device 25 to a new null in response to craft deviation from course, motor 44 also angularly displaces, from a normally null position, a wound rotor 62 relative to a three phase wound stator of an inductive transmitter device 63 with which the rotor is inductively coupled, the rotor winding being connected by way of a lead 64 with lead 37 for energization by source 18. By reason of the relative displacement of wound rotor 62 relative to its stator, voltages are developed at the stator which may be led directly to a rudder servo system through an amplifier to actuate the rudder. Such an arrangement, however, has the one drawback that if it is desired to set in a displacement signal independently of the earth inductor compass it could not be accomplished without disconnecting the compass from the system.

To the end that this may be accomplished without the necessity of disconnecting the compass from the system, novel provision is made whereby the variation in voltages developed at the stator of transmitter 63 is communicated by way of leads 65 to a three phase wound stator of an inductive course setter device 66, normally located within a master control panel (not shown), the latter stator having inductively coupled therewith a wound rotor 67. The variation in voltages at the stator of the course setter develops an angularly movable flux vector relative to rotor 67 whereby a signal is induced in the rotor proportional to the amount of craft deviation from a prescribed course.

Wound rotor 67 is mounted for angular motion relative to its wound stator by means of a conventionally journalled shaft 68 which carries a roller 69 thereon for engagement with a transversely movable disc 70 supported for rotation by a shaft 71 which is fastened to a bracket 72, the free end of which is secured to a movably mounted bar 73. In addition to engaging roller 69, disc 70 also engages an integrating disc 74 supported by a shaft 75 driven at a constant speed by a motor 76 which is energized from source 18 by way of a lead 77 tapped to conductor 37, disc 70 normally engaging integrating disc 74 at the center thereof so that disc 70 is at rest and will not rotate at such time.

The signal induced in rotor 67 is communicated to the input of a conventional vacuum tube amplifier 78 by way of a lead 79 to a first switch A having contacts 1 and 2, contact 1 being closed at this point, lead 80 to a second switch B likewise having contacts 1 and 2, contact 1 being closed at this point, a resistor 81 and a lead 82, the amplifier output being fed by way of a lead 83 to energize the variable phase 84 of a two phase induction motor 85 having a rotor 86, the second phase 87 being constantly energized from source 18 by way of a lead 88. Rotor 86 is drivably coupled to move bar 73 through a gear 89 meshing with a toothed portion of the bar, the direction of movement of the bar being determined by the phase of the signal fed to the variable phase of motor 85.

Motion of bar 73 imparts a transverse movement to disc 70 from the center of rotating disc 74 whereupon disc 70 rotates causing angular motion of roller 69 and shaft 68 whereupon rotor 67 is moved toward its new null position, i. e., toward a position wherein its electrical axis will assume a position normal to the resultant flux vector at the stator resulting from the displacement signal generated at compass element 11. Bar 73 is also provided with a toothed portion 90 thereon for engagement with a worm 91 carried by a shaft 92 which supports a wound rotor 93 energized from source 18 by means of a lead 94, the rotor being inductively coupled with a three phase wound stator 95.

Wound rotor 93 is normally at an electrical null with respect to wound stator 95, however, as soon as motor 85 moves bar 73 to displace rotor 67 toward its new null position, rotor 93 is displaced relative to its stator 95 whereby a signal is induced therein, the latter signal being opposite to the signal induced within rotor 67. Motion of rotor 67 toward its new null position decreases the signal therein until a point is reached where the signal of stator 95 is greater than the signal of rotor 67 whereupon the stator signal predominates and motor 85 is driven in a reverse direction moving rotor 93 back toward its original null and rotor 67 away from the new null it was attempting to attain. At this point disc 70 is moved toward the center of integrating disc 74 so that motion of rotor 67 gradually decreases. As rotor 93 approaches its null the signal from rotor 67, though diminished, predominates and again reverses operation of motor 85 until rotor 67 is finally brought to its new null position and rotor 93 assumes its original null position relative to stator 95. Anti-hunting on the part of the system is thus overcome and an indicating device 96 may be associated with roller 69 whose indication will correspond with the indication of master instrument 26 when rotor 67 has been brought into its new null position. When the indications of master instrument 26 and instrument 96 correspond, the system is in condition to be engaged by the human pilot to automatically control craft direction of flight.

To obtain automatic control of a rudder surface 97, contacts 1 of switches A and B are opened and their contacts 2 are closed. Thereafter, any craft deviation from a prescribed course manifests itself in a signal generated by compass element 11, reproduced at the inductive transmitter device 63 and the stator of course transmitter device 66, a corresponding signal being induced within rotor 67 thereof which is fed by lead 79 through contact 2 of switch A to the input of a conventional vacuum tube amplifier 97a the output of which is fed by a lead 98 to the variable phase 99 of a rudder servo induction motor 100, the second phase 101 of which is constantly energized from source 18 by means of leads 102 and 103. Interposed between motor 101 and a rudder actuating shaft 104 is a normally disengaged clutch 105 provided with an actuating solenoid 106 which is connected through a normally open servo switch 107 by a lead 108 with a suitable source of direct current (not shown).

For automatic control, switch 107 is closed by the human pilot whereby solenoid 106 is energized to engage clutch 105 and thereby establish a driving connection between motor 100 and rudder 97. An electrical follow-up is provided between rudder 97 and compass 11 in the form of an inductive follow-back device having a three-phase wound stator 109 inductively coupled with a wound rotor 110 energized from source 18 by way of leads 37, 77, 88 and leads 111 and 112, the rotor being mounted for angular motion by shaft 104. Actuation of shaft 104 by motor 100 produces angular displacement of wound rotor 110 from a normally null position relative to stator 109 whereby a follow-back signal is induced in the stator and fed by way of a lead 113 into amplifier 97a to be there superimposed upon the displacement signal developed at rotor 67 in the manner more fully shown in U. S. Patent No. 2,625,348. The follow-back signal generated in stator 109 is in opposition to the direction displacement signal and increases with rudder displacement as a result of the continued operation of motor 100 until a given point is reached, at which time the signal within stator 109 is exactly equal and opposite to the direction signal to thereby "wash-out" the direction signal at which time motor 100 is de-energized and rudder 97 has reached an outward position in proportion to the direction signal.

With rudder 97 in its applied position and motor 100 de-energized, the craft will begin to return to its predetermined and prescribed course. In doing so, the direction signal generated by the pick-up device 11 starts to diminish in value while the follow-back signal of stator 109, being at a maximum, becomes predominating and energizes motor 100 in a reverse direction to start bringing the rudder back to a neutral position. With reverse operation of motor 100, the signal in stator 109 diminishes as rotor 110 thereof is brought back to its normally null position wherein, unless another direction signal is being generated by the pick-up device, the rudder and the direction signal generating means are in synchronism. This condition of synchronism is desirably obtained without the provision of mechanical follow-up connections in the nature of cables, for example, between the rudder and the pick-up device.

The control of the rudder by the direction displacement signal alone will invariably result in oscillations in that the craft, as it is brought back on course, tends to overswing, only to be brought back on course once more and then overswing in the original direction of departure.

The net result is to cause the craft to weave about its course rather than to remain steadily thereon.

By impressing upon the direction signal, another signal that is dependent upon the craft's angular velocity or rate of turn, it is at once possible to control craft oscillation whereby dead beat steering and extreme stability under all weather conditions can be obtained. To this end, a rate of turn gyro is provided which comprises an electrically driven rotor 114 connected by way of lead 88 with source 18 through lead 77, the rotor having normally horizontal spin axis and mounted by way of trunnions 115 within a gimbal ring 116 which, in turn, is mounted by way of outer trunnions 117 and 118 for oscillation about a second horizontal axis perpendicular to the spin axis. Suitable resilient members such as springs 119, for example, are connected to trunnion 117 to yieldably restrain gyro precession to a rate of turn function as is known in the art.

To generate a signal proportional to the rate of craft turn, as determined by the rate gyro, an inductive transmitting device 120 is provided comprising a three phase wound stator and a wound rotor 121 inductively associated therewith, the rotor being connected to lead 37 for energization by source 18. Rotor 121, moreover, is mounted on trunnion 118 for angular motion therewith.

The stator of inductive device 120 has a voltage generated in each of its three windings proportional, respectively, to the angular position of each of the windings relative to rotor 121 and is connected by a lead 122 to the input of amplifier 97a. With rotor 121 in a given null position relative to its stator, i. e., a position in which the craft has no angular velocity, no signal will be fed to the amplifier through lead 122. As soon, however, as a departure from course occurs and the craft also develops an angular velocity, rotor 121 is moved angularly relative to its stator producing induced voltages within the stator windings, the signal developed as a result of such a change being impressed upon the direction and followback signals within amplifier 97a.

Thus three signals, i. e., direction, rate and follow-back are mixed or added algebraically within the amplifier to control operation of induction motor 100. With such provision and during an initial craft displacement from a prescribed course, the rate signal aids the direction signal and opposes the follow-back signal so that rudder is applied more rapidly than it would be by the direction signal alone and during a return to course the rate signal (the craft's angular velocity now being in an opposite direction) opposes the direction signal but adds with the follow-back signal so that the craft is prevented from overswinging from its prescribed course once it returns thereto. This is in the nature of an anticipatory control which acts to give the rudder a slight deflection in an opposite direction when it approaches "on course" so that it is braked to remain on such course. It is thus apparent that the static rudder position by the foregoing provision is made to be algebraically proportional to the sum of the rate and direction signals.

Signals for controlling the craft about its bank and pitch axes are derived from take-offs 31 and 32 located on gyro trunnions 29 and 30 within master instrument 10. The stator 33 of take-off 31 is connected by leads 125 to a three phase wound stator 126 of an inductive bank trim device having a wound rotor 127 inductively coupled therewith, the rotor being connected to the input of an amplifier 128 by way of a lead 129. Rotor 127 is supported upon a shaft 130 connected to a lever 131, the free end of which is connected to a roller 133 which cooperates with a cam 134 fastened to bar 73 so that motion of the bar in one direction rotates the roller to angularly displace shaft 130 and rotor 127 in one direction and motion of the bar in an opposite direction rotates the roller to angularly displace shaft 130 and rotor 127 in an opposite direction.

Stator 35 of the pitch take-off device 32, on the other hand, connects by way of leads 135 with a three phase wound stator 136, of a pitch trim device, having a wound rotor 137 inductively coupled therewith, the rotor being connected to the input of an amplifier 138 by way of a lead 139. Rotor 137 is supported upon a shaft 140 connected to one end of a crank 141 whose free end is secured to a roller 142 adapted for engaging two oppositely inclined cams 143 and 144 so that motion of the bar in one direction rotates roller 142 along cam surface 144 to oscillate the crank about shaft 140 as a pivot and, therefore, rotor 137 in one direction while motion of the bar in an opposite direction rotates roller 142 along cam surface 143 to oscillate the crank as well as rotor 137 in the same direction, the arrangement being such that motion of bar 73 in either direction produces angular displacement of rotor 137 in one direction only.

Three phase wound stators 126 and 136 of the bank and pitch trim devices are actually repeaters for any bank and pitch signals generated at take-offs 31 and 32 at the gyro. A displacement of the craft in pitch and bank produces relative motion of wound rotors 34 and 36 with respect to their related stators 33 and 35 whereby unbalanced voltages are developed at the stator windings which are communicated to stator windings 126 and 136. Due to such unbalance in stator windings 126 and 136, the electrical axis of rotors 127 and 137 will be no longer normal to the resultant of the two fields at the stators so that signals will be induced in each of the rotors proportional to the bank and pitch of the craft. The two signals are amplified within amplifiers 128 and 138 and the outputs thereof are fed by leads 145 and 146 to the variable phases 147 and 148, respectively, of aileron and elevator servo induction motors 149 and 150, the second phase 151 of motor 149 being constantly energized from source 18 through leads 102, 103 and a lead 152, and the second phase 153 of motor 150 being constantly energized from source 18 through leads 102, 103 and a lead 154.

Interposed between motors 149 and 150 and their respective aileron and elevator actuating shafts 155 and 156 are normally disengaged clutches 157 and 158, each of which is provided with actuating solenoids 159, 160, the solenoids being connected through normally open switches 161 and 162 by way of leads 163 and 164 with a suitable source of direct current (not shown).

Before switches 161 and 162 are closed to cause engagement of clutches 157 and 158 to establish a drivable connection between motors 149 and 150 and their respective control surfaces 165 and 166, it should be determined as to whether or not a condition of synchronism exists between the control system and the control surfaces. For example, the ailerons may be in a normally centralized position but a bank signal may exist within rotor 127 and at the output of amplifier 128 or there may be no signal at the rotor but the ailerons may be displaced. In either case motors 149 and 150 would be running as a result of the signals due to bank and pitch or to the displaced surfaces so that closing of switch 161, for example, would develop severe jolts on the system and the craft.

Connected across the outputs of amplifiers 128 and 138 are synchronization indicators 167 and 168, which may be in the form of "left-right" indicators, and if the craft is banked or tilted about its transverse axis even though the ailerons and elevators are centralized, the indicators will show the existence of the bank and pitch conditions. In order to eliminate the bank and pitch signals, stators, 126 and 136 of the bank and pitch trim devices are mounted for angular motion relative to wound rotors 127 and 137 by way of bank and pitch trim knobs 169 and 170. These knobs may be turned to angularly displace their respective stators 126 and 136 until the resultants of the magnetic fields therein assume normal positions relative to the electrical axis of rotors 127 and 137 at which time no signals are induced in either of the rotors and indicators 167 and 168 indicate a no bank and no pitch condition.

If, on the other hand, no bank or pitch signals exist in rotors 127 and 137 but ailerons 165 and elevators 166 are displaced from a centralized position such condition will be registered upon indicators 167 and 168, the reason being that inductive follow-back devices are provided comprising three phase wound stators 171 and 172, each of which is inductively associated with a related wound rotor 173 and 174, the rotors being tapped to lead 111 by way of leads 175 and 176 for energization from source 18. Rotor 173 is mounted for angular movement with shaft 155 relative to stator 171 and is at an electrical null with respect to its stators when ailerons 165 are in a centralized position. If the ailerons are deflected from a central position, rotor 173 is displaced to a position other than a null position at which time a signal is induced in stator windings 171 and fed therefrom by a lead 177 to amplifier 128 where indicator 167 registers such unbalance.

Rotor 174 of the elevator follow-back device, on the other hand is mounted for angular movement with shaft 156 and is at an electrical null with respect to its stator when elevator 166 is in a centralized position. If the elevators are deflected from a central position, rotor 174 is displaced to a position other than a null position at which time a signal is induced in the stator windings 172 and fed therefrom by a lead 178 to amplifier 138 where indicator 168 registers such unbalance.

The human pilot may then operate the aileron and elevator control surfaces manually until they are centralized whereupon rotors 173 and 174 return to their null position so that the signals at stators 171 and 172 drop to zero and indicators 167 and 168 show this condition. The system is now in synchronism with the control surfaces and switches 161 and 162 may be operated to connect servo motors 149 and 150 with their respective control surfaces 165 and 166. Thereafter, any craft displacement in bank or pitch will result in signals induced in bank and pitch take-offs 31 and 32 which are also induced within rotors 127 and 137 and amplified within amplifiers 128 and 138 to energize variable phases 147 and 148 of motors 149 and 150. The motors, being thus energized, drive ailerons 165 and elevators 166 from their central position and simultaneously therewith rotors 173 and 174 of the follow-back devices are displaced from their electrical nulls relative to stators 171 and 172 whereby follow-back signals are generated in the stators and fed to their respective amplifiers to be there superimposed upon the bank and pitch signals. These follow-back signals induced within stators 171 and 172 are in opposition to the bank and pitch signals and increase with aileron and elevator displacement as a result of the continued operation of motors 149 and 150 until a given point is reached, at which time the signals induced in stators 171 and 172 are exactly equal and opposite to the bank and pitch signals at which time motors 149 and 150 are de-energized and the ailerons and elevators have reached an outward position proportional to the bank and pitch signals.

With ailerons 165 and elevators 166 in their applied positions and motors 149 and 150 de-energized, the craft will begin to return to a centralized position. In doing so the bank and pitch signals at take-offs 31 and 32 diminish in value while the follow-back signals of stators 171 and 172, being at maximum, become predominating and energize motors 149 and 150 in a reverse direction to start bringing the ailerons and elevators back to their neutral positions wherein the control surfaces and the bank and pitch generating means are synchronized. As in the case of the direction control channel, the condition of synchronism is obtained without the use of mechanical follow-up connections such as cables between the ailerons and elevators and the bank and pitch controls.

By impressing upon the bank and pitch signals, another signal which is dependent upon the craft's angular velocity or rate of turn developed during the bank and pitch or climb of the craft, it is possible to control oscillation about the bank and pitch axis which might otherwise occur. To this end, therefore, rate of turn gyros are provided, each comprising electrically driven rotors 179 and 180 connected by way of leads 181 and 182 with source 18 through lead 37, rotor 179 having a normally vertical spin axis and rotor 180 having a normally horizontal spin axis displaced 90° from the position of the spin axis of rotor 114 of the rate gyro in the direction channel, rotor 179 being mounted by way of trunnions 183 within gimbal ring 184 which, in turn, is mounted by way of outer trunnions 185, 186, for oscillation about a horizontal axis parallel with the craft's longitudinal axis and rotor 180 being mounted by way of trunnions 187 within a gimbal ring 188 which is mounted by way of outer trunnions 189, 190, for oscillation about a vertical axis perpendicular to the craft's longitudinal axis. Springs 191 and 192 are connected to trunnions 185 and 189, respectively, to yieldably restrain gyro precession to a rate of turn function.

In order to generate signals proportional to the rate of the craft's angular velocity developed during craft bank and pitch, inductive transmitting devices are provided comprising three phase wound stators 193 and 194 having industively associated therewith wound rotors 195 and 196, the rotors being connected for energization from source 18 by way of leads 197 and 198 tapped to lead 37. Rotors 195 and 196, moreover, are carried for angular motion relative to their stators by trunnions 186 and 190 and when the craft is centralized about its bank and pitch axes the two rotors are at an electrical null with respect to their stators. As soon as craft bank and pitch occurs an angular velocity is developed about the craft's transverse axis as well as about its longitudinal axis causing rotors 179 and 180 to precess and thereby displace the rotors relative to their stators 193 and 194 inducing in the latter signals which are led to the amplifiers 128 and 138 by way of leads 199 and 200 to be there superimposed upon the bank and pitch signals and the related follow-back signals in the same manner and for the same purpose as described in connection with the direction displacement signal.

Novel provision is made, furthermore, for changing the direction of flight of the craft from one prescribed course to a second and predetermined course with the automatic pilot engaged and without disconnecting the compass element 11 from the system. To this end, the stator of the course setter device 66 is mounted for angular movement relative to its wound rotor 67 and to the end that such stator displacement may be accomplished, a direction trim knob 201 is provided.

Actuation of knob 201 produces angular motion of the course setter stator so that a signal is induced within rotor 67 thereof. The signal is fed from rotor 67 by way of lead 79 to the input of amplifier 97a whereupon variable phase 99 of motor 100 is energized to apply rudder whereby the craft turns toward its new course an angular amount corresponding to the amount of change of course set in by knob 201. During the turn a follow-back signal and a rate signal are developed to modify the operation of motor 100 and rudder 97 in the manner hereinabove described. The craft changes course in a flat turn until such time as the signal developed from the earth's magnetic field by element 11 and reproduced in the stator windings of the inductive transmitter device 63 is sufficient to move the resultant of the magnetic field at the stator of the course setter device 66 to a position normal to the electrical axis of rotor 67 whereupon the induced signal in the rotor diminishes to zero and the craft will have reached its new course. Thereafter, the automatic pilot maintains the craft on its new course until and unless knob 201 is again operated.

A further novel and desirable feature of the automatic pilot of the present invention is that an automatic turn may be imparted to the craft without disconnecting compass element 11 from the system. To this end, the three phase wound stator 93 of the inductive follow-up device is mounted for angular displacement relative to its rotor 93, an automatic turn control knob 202 being provided to accomplish this purpose. By setting knob 202, a steady rate of turn of the craft may be developed with the correct bank and pitch signals automatically set in for the given rate of craft turn.

In manually displacing automatic turn knob 202, stator 95 is angularly displaced from its normally null position relative to its rotor 93 whereupon a signal is induced in the stator and fed by way of a lead 82 to amplifier 78 and out therefrom to energize variable phase 84 of motor 85 whereupon the motor moves bar 73 in one direction or another, depending upon the direction of the turn set in by knob 202, to displace disc 70 relative to integrating disc 74 whereby wound rotor 67 of the course setter device 66 is angularly displaced from its null position relative to its stator, a signal being induced within rotor 67 and fed therefrom through amplifier 97a to operate rudder surface 97 and thereby impart a constant rate of turn to the craft.

Simultaneously with the displacement of rotor 67 relative to its stator by bar 73, the bar, in moving likewise displaces rotors 127 and 137 of the bank and pitch trim devices relative to their respective stators 126 and 136 whereby the correct bank and pitch signals are developed to operate the aileron and elevator surfaces the correct amount for the particular rate of turn of the craft set in by knob 202, it being noted that whether the turn be to the left or right of a given course up elevator is provided in either case.

Follow-up motor 85, in response to the signal developed at stator 95 by the turn knob, will continue to move bar 73 until the latter has moved rotor 93 into a new null position relative to stator 95 whereupon the signal in the latter drops to zero and motor 85 becomes de-energized. At this point disc 70 has been displaced from its normal position relative to integrating disc 74 a sufficient amount so that rotor 67 of the course setter device 66 is angularly displaced at a constant rate relative to its stator. Such operation would continue indefinitely because the displacement signal developed within rotor 67 will always be ahead of the signal communicated to the stator of the course setter device by compass element 11. Thus an automatic turn control is provided whereby the craft may be maneuvered into an automatic turn at any desired rate without disconnecting the compass element from the system, the turn being completed whenever knob 202 is returned manually to a normal position.

To disengage the automatic steering system of the present invention so that the human pilot may control the craft manually, contacts 2 of switches A and B are opened and contacts 1 thereof closed while servo switches 107, 161 and 162 are opened whereupon clutches 105, 157 and 158 disconnect the rudder, aileron and elevator surfaces from their respective servomotors 100, 149 and 150. For automatic flight, on the other hand, the human pilot opens contacts 1 of switches A and B and closes contacts 2 thereof as well as servo switch 107 of the rudder channel. When indicators 167 and 168 indicate a condition of synchronism, switches 161 and 162 of the aileron and elevator channels are closed and thereafter, whenever the craft deviates from a prescribed course and/or a predetermined attitude the system is immediately effective to return the craft to its prescribed course and/or attitude.

Separate amplifiers 97, 128 and 138 have been shown for the direction, bank and pitch channels, however, one amplifier embodying all three channels may be used equally as well, such amplifier being shown and described in our above-mentioned U. S. Patent No. 2,625,348. Moreover, the various inductive devices have been shown as having wound stators and wound rotors inductively coupled therewith, however, electromagnetic devices comprising wound stators having unwound magnetic rotors inductively coupled therewith of the character described and claimed in the above referred to U. S. Patent No. 2,342,637 may be used in place thereof.

There has thus been provided a novel all electric automatic pilot wherein the principal control signals, i. e., direction, bank and pitch are derived from a single master instrument. Moreover, novel provision is made for a direction trim adjustment whereby the craft, with the automatic pilot engaged, may be forced to change course without the necessity of disconnecting the compass element 11 from the system. Furthermore, an automatic turn may be impressed upon the craft whereby upon the operation of a single knob a steady rate of turn signal is developed together with the proper bank and pitch signals required for the particular rate of turn called for.

Although but a single embodiment of the invention has been illustrated and described in detail for controlling a mobile craft about all three of its axes, it is to be expressly understood that the invention is not limited thereto. Various changes may also be made in the design and arrangement of the parts without departing from the spirit and scope of the invention as the same will now be understood by those skilled in the art. For example, some of the stators of the inductive devices may be two phase wound instead of three, or three phase wound stators may be provided but only two of the phases would be sufficient to perform the various functions described. For a definition of the limits of the present invention reference will be had primarily to the appended claims.

We claim:

1. In an automatic pilot for a craft having rudder, aileron and elevator control surfaces thereon for maintaining it on a predetermined course and in a predetermined attitude, servomotors for each of said control surfaces, a single and composite master instrument comprising an artificial horizon gyroscope having a normally vertical spin axis and mounted for oscillation about two mutually perpendicular horizontal axes, directional reference means mounted on said gyro and stabilized thereby in a substantially horizontal plane for generating a first signal in response to departure of said craft from said predetermined course for energizing said rudder motor, and bank and pitch responsive means for generating second and third signals in response to departure of said craft from said predetermined attitude for energizing said aileron and elevator motors, said bank responsive means being mounted on one of said mutually perpendicular axes of said gyroscope and said pitch responsive means being mounted on the other of said mutually perpendicular axes.

2. In an automatic pilot for a craft having rudder, aileron and elevator control surfaces thereon for maintaining the craft on a predetermined course and in a predetermined attitude, electric motors for each of said control surfaces, a single and composite master instrument comprising an artificial horizon gyroscope having a normally vertical spin axis and mounted for oscillation about two mutually perpendicular horizontal axes, directional reference means comprising a magnetic field pick-up device supported on and stabilized by said gyroscope in a substantially horizontal plane and disposed in the earth's magnetic field for generating an electric signal in response to relative displacement of said pick-up device with respect to said earth's magnetic field to energize said rudder motor, and bank and pitch responsive means for generating electric bank and pitch signals in response to departure of said craft from said predetermined attitude for energizing said aileron and elevator motors, said bank responsive means being mounted on one of said mutually perpendicular axes of said gyroscope and said pitch responsive means being mounted on the other of said mutually perpendicular axes.

3. In an automatic pilot for a craft having rudder, aileron and elevator control surfaces thereon for maintaining the craft on a predetermined course and in a predetermined attitude of bank and pitch, electric motors for each of said control surfaces, a single and composite master instrument comprising an artificial horizon gyroscope having normally vertical spin axis and mounted for oscillation about two mutually perpendicular horizontal axes, directional reference means comprising a magnetic field pick-up device supported on and stabilized by said gyroscope in a substantially horizontal plane and disposed in the earth's magnetic field for generating an electric signal in response to relative displacement of said pick-up device with respect to said earth's magnetic field to energize said rudder motor, an electrical inductive device mounted on one of said mutually perpendicular horizontal axes and responsive to departure of said craft from said predetermined attitude in bank for generating an electric bank signal to energize said aileron motor, and a second electrical inductive device mounted on the other of said mutually perpendicular axes and responsive to departure of said craft from said predetermined attitude in pitch for generating an electric pitch signal to energize said elevator motor.

4. In an automatic pilot for a craft having rudder, aileron and elevator control surfaces thereon for maintaining it on a predetermined course and in a predetermined attitude, servomotors for actuating each of said control surfaces, a single and composite master instrument comprising an artificial horizon gyroscope having a normally vertical spin axis and mounted for oscillation about two mutually perpendicular horizontal axes, directional reference means mounted on said gyro and stabilized thereby in a substantially horizontal plane for generating a first signal in response to departure of said craft from said predetermined course for energizing said rudder motor, bank and pitch responsive means for generating second and third signals in response to departure of said craft from said predetermined attitude for energizing said aileron and elevator motors, said bank responsive means being mounted on one of said mutually perpendicular axes of said gyroscope and said pitch responsive means being mounted on the other of said mutually perpendicular axes, and means permanently connected for operation by said surfaces in response to the actuation of said surfaces by said motors for generating direction, bank and pitch follow-up signals for modifying said first, second and third signals.

5. In an automatic pilot for a craft having rudder, aileron, and elevator control surfaces thereon for maintaining it on a predetermined course and in a predetermined attitude, servomotors for actuating each of said control surfaces, a single and composite master instrument comprising an artificial horizon gyroscope having a normally vertical spin axis and mounted for oscillation about two mutually perpendicular horizontal axes, directional reference means mounted on said gyro and stabilized thereby in a substantially horizontal plane for generating a first signal in response to departure of said craft from said predetermined course for energizing said rudder motor, bank and pitch responsive means for generating second and third signals in response to departure of said craft from said predetermined attitude for energizing said aileron and elevator motors, said bank responsive means being mounted on one of said mutually perpendicular axes of said gyroscope and said pitch responsive means being mounted on the other of said mutually perpendicular axes, and electrical inductive devices permanently connected with said surfaces and operable in response to the actuation of said surfaces by said motors for generating direction, bank and pitch follow-up signals for modifying said direction, bank and pitch signals.

References Cited in the file of this patent

UNITED STATES PATENTS

| | | |
|---|---|---|
| 2,240,680 | Stuart | May 6, 1941 |
| 2,383,461 | Esval | Aug. 28, 1945 |
| 2,410,468 | Van Auken | Nov. 5, 1946 |
| 2,415,430 | Frische | Feb. 11, 1947 |